United States Patent [19]
Shalaby et al.

[11] Patent Number: 5,874,509
[45] Date of Patent: Feb. 23, 1999

[54] SURFACE MODIFIED GLASSES AND COMPOSITES THEREOF

[75] Inventors: Shalaby W. Shalaby, Anderson, S.C.;
Daniel C. Clupper, Gainesville, Fla.;
Theodore D. Taylor, Seneca, S.C.

[73] Assignee: Clemson University, Clemson, S.C.

[21] Appl. No.: 676,004

[22] Filed: Jul. 5, 1996

[51] Int. Cl.$^6$ .................................................. C08L 101/02
[52] U.S. Cl. ..................... 526/194; 424/423; 424/426; 501/11; 501/35; 606/77; 623/16
[58] Field of Search ..................... 424/426, 423; 623/16; 606/77; 501/11, 35; 526/193, 194

[56] References Cited

U.S. PATENT DOCUMENTS

| | | | |
|---|---|---|---|
| 3,897,236 | 7/1975 | Roberts | 71/1 |
| 4,612,923 | 9/1986 | Kronenthal | 128/92 R |
| 4,655,777 | 4/1987 | Dunn et al. | 623/16 |
| 4,728,678 | 3/1988 | Chatelin | 523/203 |
| 5,103,000 | 4/1992 | Akiyama | 544/69 |
| 5,108,755 | 4/1992 | Daniels et al. | 424/426 |
| 5,342,659 | 8/1994 | Horowitz | 427/553 |

FOREIGN PATENT DOCUMENTS

| | | |
|---|---|---|
| 2057420 | 4/1981 | United Kingdom . |
| 2081703 | 2/1982 | United Kingdom . |

OTHER PUBLICATIONS

"Effect of Annealing Temperature on the Degradation of Reinforcing Fibers for Absorbable Implants", J. Biomedical Materials Research, vol. 29, 1309–1315 (1995).

Interface Modification in Glass Fibre Reinforced Polycarbonate Composites for Dental Applications, Ranade et al, Institute of Materials Science, U–136, U. of Connecticut, Polymer. Prep. 37 (1) 851 (1996).

*Primary Examiner*—Fred Zitomer
*Attorney, Agent, or Firm*—Leigh P. Gregory

[57] ABSTRACT

An inorganic glass having an aliphatic polymer covalently bonded to the surface thereof is disclosed for providing improved adhesion to a matrix polymer when the glass is employed as a composite filler, as well as for the formation of a composite absent a separate matrix polymer. The polymer is grafted onto the glass by a method which includes the steps of pretreating the surface of the glass with an activator which an activating moiety to the surface, functionalizing the pretreated surface by bonding functional moieties thereto, and polymerizing a cycloaliphatic monomer onto the functionalized surface in the presence of a ring opening polymerization catalyst. Also disclosed are novel inorganic glasses which contain both silicate and phosphate linkages.

5 Claims, No Drawings

SURFACE MODIFIED GLASSES AND COMPOSITES THEREOF

BACKGROUND OF THE INVENTION

Inorganic glasses are well known as composite fillers or fibers for a variety of applications. Specifically, phosphate glasses are known to be absorbable and have been considered, in combination with slow-absorbing hydrophobic matrices, for use in the formation of implantable medical devices.

It is believed that medical plates or screws, such as are employed in the internal fixation of fractured rigid bones, which are formed of high modulus absorbable phosphate glass fibers in an appropriate matrix will yield a composite of a desired level of stiffness which retains measurable mechanical strength at three to six months and fully absorbs in one to three years, thereby maintaining mechanical integrity as the bone heals and absorbing within a reasonable period. However, it has been recognized that there are two basic shortcomings of such a glass-reinforced system, namely, the unacceptably fast absorption and strength loss profile of the glass fibers and poor interface or adhesion between the inorganic glass fibers and the organic matrix.

It has been shown that high temperature annealing of iron-containing phosphate-glass fibers is a promising approach to prolong the strength retention of the fibers and, possibly, the absorbable composites thereof.

To address the fiber-matrix interface, recent investigators have attempted, with limited success, the use of coupling agents, a successful strategy in thermosetting nonabsorbable composites, to improve the interfacial adhesion in absorbable composites of thermoplastic matrices. This created a need for a new approach to creating a novel interface in absorbable glass-reinforced composites which can also be applicable to the more traditional, industrially important nonabsorbable composites.

Nonabsorbable fiber-reinforced composites are used widely in structural industrial applications as well as biomedical applications (e.g., dental and orthopedic). However, as in all composites, the interface between the matrix and reinforcing filler, be it a fiber or powder, has a great effect on the effectiveness of the latter in imparting desirable properties. Toward increasing the interaction or adhesion of glass fillers to organic matrices for composites in general, the use of silane coupling agents has been known for a few decades and was associated with variable degrees of success.

For composites of thermoplastic polymers with silicate glass filler in addition to the silane coupling agents, silicate glass has been surface modified to provide covalently linked hydroxylic groups which were allowed to condense with oligomeric carbonate molecules to place grafts on the glass surface. It is claimed that having these grafts is responsible for achieving a modifying interface and increases the adhesion between the filler and matrix. In effect, such treatment is reported to improve the mechanical properties of the polycarbonate composites. However, this process of surface modification is limited by (a) kinetics of the condensation reaction; (b) the type and chain length of the organic polymer and availability of reactive end groups for condensing with the hydroxyl group; (c) use of high temperature to achieve condensation and possible formation of degradation products; and (d) formation of condensation by-products that need to be removed. Thus, a novel approach for grafting organic chains onto glass surface that features none of the disadvantages associated with the polycarbonate coupling (or condensation) was conceived and is the subject of this invention.

Thus, it is an object of the present invention to provide a surface modified glass having improved compatibility with a variety of composite matrices.

It is a further object of the present invention to provide a method for the surface modification of both absorbable and nonabsorbable glasses to allow chemical abridging of the inorganic fibers to the organic matrix.

It is yet another object of the present invention to provide a novel phosphate-based glass which has a reduced absorption rate.

SUMMARY OF THE INVENTION

These as well as other objects are achieved by providing a surface grafted glass comprising an inorganic glass covalently bonded to an aliphatic polymer of a cycloaliphatic monomer.

Such objects are also achieved by providing a method for grafting a polymer onto an inorganic glass which includes the steps of: pretreating the surface of the inorganic glass with an activator, the activator being a compound capable of covalently bonding an activating moiety to the surface, the activating moiety being selected from the group consisting of halides and oxyalkanes, functionalizing the pretreated surface by reaction with a functionalizing agent, the functionalizing agent comprising an organic compound having at least a first functional moiety which is an hydroxyl group and a second functional moiety selected from the group consisting of —OH, $NH_2$ and —NHR where R is an alkyl group, wherein one of the functional moieties of the functionalizing agent reacts with the activating moiety, thereby bonding the functionalizing agent to the surface of the glass, and polymerizing a cycloaliphatic monomer onto the functionalized surface in the presence of a ring opening polymerization catalyst.

Such objects are further achieved by providing an inorganic glass which has both Si—O—Si linkages and P—O—P linkages.

DESCRIPTION OF THE PREFERRED EMBODIMENTS

The present invention is directed to surface modified inorganic glasses containing, primarily, ≡Si—O—Si≡ or ≡P—O—P≡ linkages such as those generally known as polysilicates or polyphosphates, respectively. The surface modification in accordance with the present invention entails the covalent binding of hydroxyl- and/or amine-bearing organic groups which are capable of initiating the ring opening polymerization of lactones (e.g., ε-caprolactone, lactide, glycolide, ether-lactone (e.g., p-dioxanone, 1,5-dioxepan-2-one), cyclic carbonates (e.g., trimethylene carbonates), lactams (e.g., caprolactam, laurolactam), and depsipeptides (e.g., morpholinediones). The surface grafted glass particles in the form of powders or fibers can form composites directly by thermal processing or by mixing with molten organic matrices having solubility parameters comparable to those of the grafted chains. Both types of composites exhibit novel interfaces where the adhesion between the inorganic and organic components is indirectly achieved by interdiffusion of the organic chains. Depending on the chemical structure of the filler and matrix, these composites can be made to be bioabsorbable or biostable (or durable). For example, in accordance with the present invention a phosphate-based glass can be first reacted with phosphorus oxychloride and then amino-alcohol to form

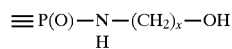

where X can be 2-10. The hydroxy-bearing surface can then be grafted with ε-caprolactone to bind covalent, lactone-derived polyester chains onto the glass surface. Composites of the surface-grafted phosphates with polymers made of one or more of the following lactones: ε-caprolactone, glycolide, lactide, and p-dioxanone, can be used as high modulus, absorbable materials. Similarly, grafted silicates can be used to form nonabsorbable, or durable, composites having a thermoplastic (e.g., polytetramethylene terephthalate) or a thermosetting organic matrix (e.g., epoxy or unsaturated polyesters). Alkane diols such as hexanediol and diamino-alkanes such as 1,10-diamino-decane can be used to provide hydroxyl or hydroxyl and amine anchoring groups for ring opening polymerization. For instance, surface modified silicate glasses with amine anchoring groups can be used to graft lactams, such as ε-caprolactam. Subsequently, the grafted glass can be used to form composites having a nylon matrix with interdiffusing polyamide chains at the inorganic/organic interface.

In another aspect the present invention is directed to novel fiber-forming silicophosphate glasses and bioabsorbable composites thereof. Typical glasses are formed by reacting a dihydrogen phosphate salt and $SiO_2$ with alkali and alkali metal oxides (or carbonates) at or above 600° C. to produce compositions comprising by mole:

| | |
|---|---|
| $Na_2O$ | 0–50% |
| CaO | 0–30% |
| $SiO_2$ | 1–30% |
| ZnO | 1–40% |
| $P_2O_5$ | 0–70% |

The formation of novel silicophosphate glasses with modulated absorption profiles and having silicate units representing less than 10% of the total mass of the glass is preferred depending on the absorbability required for the desired end-use application. More preferred are such inorganic glasses having less than about 5% by weight of silicate. Typically, the silicophosphate glasses of the present invention, as well as other inorganic glasses which may be employed in accordance with the present invention, are converted to fibers having a diameter of 0.1–200 μ. The fibers are pretreated with an activator, preferably a phosphorous compound of the formula $P(O)X_3$ wherein X may be selected from Cl, Br, $OCH_3$, or $OC_2H_5$. Also within the scope of the present activator are $SiCl_4$, $TiCl_4$, and $C_2H_5Si(OCH_3)$. Following pretreatment the surfaces of the fibers are treated with a functionalizing agent which reacts with the halide or alkoxy groups introduced by the activator and which supplies the surface with polymerization initiation groups. Preferred functionalizing agents are alkanediols or aminoalkanols wherein the alkane has from 2 to 10 carbon atoms. The functionalized glass is then treated with a cyclic monomer such as ε-caprolactone to effect surface grafting onto the —OH, —$NH_2$ or —NHR (R=alkyl) group in the presence of a ring opening polymerization catalyst such as stannous octoate. To produce an absorbable composite, the grafted glass is mixed with molten absorbable polymer. For glasses grafted with polycaprolactone (PCL) the matrix may be one or more of glycolide, l-lactide, or p-dioxanone. Depending on the required modulus, the glass fraction can be varied between 10 and 90 weight percent. Depending on the degree of grafting and the lengths of the polymer chains, it is also within the scope of the present to employ the grafted glass at 100 percent; that is, the grafted glass alone, without a matrix polymer, may be formed into a composite.

Accordingly, the present invention is directed to the formation of novel surface grafted glasses, where grafting takes place by ring opening polymerization of cyclic monomers to form, for example, polylactone or polylactam grafts with the initiator being an —OH, —$NH_2$, or —NHR (R=alkyl) group that is anchored covalently to the glass surface. The length of the graft can be controlled by the monomer to glass ratio. The graft can be homopolymeric or copolymeric depending on the monomers used. Depending on the organic/inorganic mass ratio, the grafted glass can be fused, by molding or extrusion, to the composite articles with or without the incorporation of additional matrix polymer or polymers that have identical or comparable chemistry to that of the grafted chains.

The present invention is also concerned with the use of glasses with different absorption or dissolution profiles through adjusting the glass composition between a nonabsorbable glass, such as silicates, and absorbable ones, such as those based on phosphates. The absorbable glasses, such as phosphates and silicophosphates, will be grafted with cyclic monomer known to produce hydrolyzable chains which can be further mixed with traditionally absorbable polymers. Both can be converted, such as by extrusion or molding, to absorbable biomedical prostheses having exceptional mechanical properties because of the unique filler-matrix interface characterizing their composite materials. Similarly, silicates and phosphosilicates, which are virtually nonabsorbable, can be used to produce durable composites with exceptional mechanical properties for use as structured composites.

To further clarify and disclose the present invention to those of skill in the art, the following Examples are presented.

EXAMPLE 1

Formation of Phosphate Glasses

Shown in Table I are the stock powders (or starting material) used which decompose upon exposure to heat to yield the desired oxides. Silicic acid loses 10.63 weight percent after exposure to high temperatures.

TABLE I

| Oxides Obtained and Gasses Evolved During Calcination | | |
|---|---|---|
| Starting Material | Gases Evolved | Remaining Oxide |
| $(NH_4)H_2PO_4$ | $H_2O$, $NH_3$ | $P_2O_5$ |
| $KH_2PO_4$ | $H_2O$ | $K_2O$, $P_2O_5$ |
| ($SiO_2$ × $H_2O$) | $H_2O$(10.63 wt. %) | $SiO_2$ |
| $Na_2CO_3$ | $CO_2$ | $Na_2O$ |
| $NaH_2PO_4$ | $H_2O$ | $Na_2O$, $P_2O_5$ |

Taking into account the release of gas from the starting materials, component weights necessary to produce glasses with the desired oxide molar ratios were calculated. Stock powders were weighed to the nearest 0.5 mg prior to the thorough mixing of batches. A Thermolyne 4800 muffle furnace was used to heat batches in porcelain crucibles (Coors, 15 ml capacity) from room temperature at a rate of approximately 15° C./min. Between 300° C. and 600° C., the starting materials underwent loss of water, carbon dioxide, and ammonia. Melting then occurred between 700° C. and 1100° C. Once the melt appeared clear and homogeneous (usually between 800–900° C.), the glass was poured onto a steel mold and annealed at 200° C. for 15–30 minutes and allowed to slowly cool to room temperature. Melts were preferably poured at the lowest temperature possible to reduce volatilization of $P_2O_5$. Glass pellets about 1 cm in diameter were produced by this method.

Glass Sample 1, a novel silicophosphate glass in accordance with the present invention, was produced by the above-described method, having a molar composition of 60% $P_2O_5$, 8.67% $Na_2O$, 8.67% CaO, 18.66% ZnO, and 4% $SiO_2$.

Glass Sample 2 was produced by the above-described method and had a molar composition of 60% $P_2O_5$, 10% $Na_2O$, 20% CaO, and 10% ZnO.

Glass Sample 3, a novel silicophosphate glass in accordance with the present invention, was produced by the above-described method, having a molar composition of 60.0% $P_2O_5$, 13.33% $Na_2O$, 20.0% CaO, 3.33% ZnO, and 3.33% $SiO_2$.

Glass Sample 4, a novel silicophosphate glass in accordance with the present invention, was produced by the above-described method, having a molar composition of 60.0% $P_2O_5$, 5.0% $Na_2O$, 16.0% CaO, 15.0% ZnO, and 4.0% $SiO_2$.

Glass Sample 5, a novel silicophosphate glass in accordance with the present invention, was produced by the above-described method, having a molar composition of 60.0% $P_2O_5$, 5.0% $Na_2O$, 5.0% CaO, 26.0% ZnO, and 4.0% $SiO_2$.

Glass Sample 6, a novel silicophosphate glass in accordance with the present invention, was produced by the above-described method, having a molar composition of 60.0% $P_2O_5$, 16.0% $Na_2O$, 5.0% CaO, 15.0% ZnO, and 4.0% $SiO_2$.

EXAMPLE 2

Glass Fiber Formation

Glass Samples 1 and 2 were dried, ground and transferred to a heated platinum bushing at a predetermined temperature (above Tg) and allowed to spin into fine filaments. Both samples were shown by TGA to be stable at the spinning (or drawing) temperature and displayed no crystallization at or slightly above the spinning temperature, as shown by DSC. Glass composition, processing, and fiber data are given in Table II below.

TABLE II

Fiber Formation Data

| Glass Sample No. | 1 | 2 |
|---|---|---|
| Tg, °C. | 293 | 312 |
| Spinning Temp., °C. | 632 | 597 |
| Fiber Diameter, $\mu$ | 25 | 15 |
| Tensile Strength, MPa | 1000 | 630 |
| Modulus, GPa | 790 | 230 |

EXAMPLE 3

Surface Activation and Functionalization of Glass Sample 1

Glass Sample 1, in the form of fibers as disclosed above, was surface activated and functionalized. One gram of fibers was reacted with 15 ml phosphorus oxychloride ($POCl_3$) in a dry nitrogen environment. The solution was shaken several times during the reaction to ensure proper mixing. After 3 hours at 80° C., the mixture was allowed to cool to room temperature under nitrogen. The $POCl_3$ was decanted and the glass was washed a minimum of three times using 25 ml aliquots of acetone.

Samples were subsequently treated with 1,6-hexanediol or 6-amino-1-hexanol. Samples treated with these materials were then used in the caprolactone grafting reactions, discussed below. Durability tests were performed on the glasses bonded to a diol.

For introducing hydroxyl groups, one gram of a diol (e.g., ethylene glycol or 1,6 hexane diol) was dissolved in acetone (15 ml) and added to fibers of Glass Sample 1 immediately after treatment with $POCl_3$ and rinsing with acetone. A condenser was used to prevent the loss of acetone during the 3 hour reaction in a dry nitrogen environment at 55° C. The solution was then allowed to cool to room temperature under nitrogen. The liquid was then decanted and the glass was washed a minimum of three times with 25 ml aliquots of acetone. To test its durability, the glass was subsequently vacuum dried for 2 hours. Samples (250 mg±0.5 mg) were then immersed in 50 ml distilled water in polypropylene specimen jars. Specimens were kept in an environmental chamber at 37° C. for 48 hours. Samples were then dried and weighed. The percent loss by weight was then calculated.

For the amino alcohol reaction, approximately 0.1 g 6-amino-1-hexanol in 15 ml methylene chloride was added to Glass Sample 1 fibers immediately after treatment with $POCl_3$ and rinsing with acetone. The experimental set-up was equipped with a condenser to prevent the loss of methylene chloride during the 3 hour reaction in a dry nitrogen environment at 40° C. The solution was then allowed to cool to room temperature under a dry nitrogen atmosphere. The methylene chloride was then decanted and the glass was washed 3–4 times with 25 ml aliquots of methylene chloride. The glass was subsequently vacuum dried for 2 hours at room temperature.

Table III below outlines the Functionalized Glasses produced from Glass Sample 1 in accordance with Example 3 by their respective functionalizing agent.

TABLE III

| Glass | Functionalizing Agent |
|---|---|
| Functionalized Glass 1 | ethylene glycol |
| Functionalized Glass 2 | 6-amino-1-hexanol |
| Functionalized Glass 3 | 1,6-hexanediol |

EXAMPLE 4

Grafting by Ring-Opening Polymerization and Characterization of Grafted Glasses

Two grams of a functionalized glass, 3 ml ε-caprolactone, and stannous octoate (monomer/catalyst ratio of 5000/1) in toluene were mechanically stirred in a dry nitrogen environment at 160° to 170° C. for 5–6 hours. The resulting product was then allowed to cool to room temperature under nitrogen and was subsequently stored under vacuum at room temperature. Table IV below outlines the grafted glasses produced in accordance with Example 4 and their respective functionalized glass precursors.

TABLE IV

| Grafted Glass | Precursor Glass |
| --- | --- |
| Grafted Glass 1 | Functionalized Glass 1 |
| Grafted Glass 2 | Functionalized Glass 1 |
| Grafted Glass 3 | Functionalized Glass 2 |
| Grafted Glass 4 | Functionalized Glass 3 |
| Grafted Glass 5 | Activated ($POCl_3$ treated, not) functionalized) Glass Sample 1 |
| Grafted Glass 6 | Glass Sample 1 (not activated or functionalized) |

The extent of the grafting reaction was assessed by measuring the amount of polymer remaining bonded to glass samples after extraction in methylene chloride. Grafted glass fiber samples (2 g) were chopped into small pieces and immersed in 10 ml methylene chloride. Each extraction consisted of sonication (2 min), mechanical shaking (2 hr), and finally, sonication (2 min). Then the liquid was decanted and 10 ml fresh methylene chloride was added. The extraction/decanting procedure was then repeated twice more. The solid remaining after three extractions was allowed to dry under vacuum at room temperature. The dry weight of the insoluble materials was then recorded.

Differential scanning calorimetry (DSC), thermogravimetric analysis (TGA), infrared (IR) spectroscopy, and X-ray photoelectron spectroscopy (XPS) were used to characterize the extent of the grafting. Infrared spectroscopy was performed on Glass Sample 1 as well as the grafted glasses using the KBr pellet technique. XPS was performed on functionalized glasses at IBM Endicott Microelectronics using a PHI 5500 multiprobe spectrometer. This technique was used to determine the elemental composition of the outermost surface (50–100 Å). The instrument was operated at $1 \times 10^{-10}$ Torr using Al $K\alpha$ radiation. The sensitivity of the spectrometer was 0.5 atomic percent using a lens aperture of 400 microns.

DSC scans of the grafted glass samples revealed melting endotherms for polycaprolactone (PCL) comparable to those for commercial PCL (Tm=62° C. and $\Delta H_f$=100 J/g. The melting temperatures ranged from 42.3° C. to 59.0°, and heat of fusion values for experimental composites ranged from 8.5 to 93.7 J/g. These heat of fusion values cover a wide region since the polymer content in composite samples varied. However, most samples were 60 weight percent polymer. Heat of fusion values for pure polymer samples would therefore be approximately 1.7 (100/60) times higher than those samples composed of 60% polymer.

PCL degradation results in weight loss, and therefore, the presence of PCL on glass surfaces can be detected by TGA. The accepted value for polycaprolactone decomposition is approximately 350° C. Grafted Glasses 1 and 2, characterized by TGA lost approximately 4% and 13% by weight following one extraction in methylene chloride to remove free polymer (not grafted). The weight loss occurred near 360° C. A similar PCL degradation temperature (368° C.) was obtained for the thrice-extracted third sample following DSC analysis. Several characterization techniques, namely DSC, XPS, nitrogen analysis, and FTIR spectroscopy, were used to determine that polycaprolactone was retained on the surface of Grafted Glass 3 after three extractions in methylene chloride. Grafted Glass 3 underwent $POCl_3$ and 6-amino-1-hexanol surface treatments. The melting temperature of the organic component of Grafted Glass 3 was 57.6° C. and the heat of fusion was 48.0 J/g. An endothermic peak was recorded at 53.0° C after three extractions in methylene chloride. This peak is likely PCL (and not 6-amino-1-hexanol) for the following reasons. Although 6-amino-1-hexanol melts at approximately 55° C., this material was not believed to be present in the grafted composite in sufficient quantities to produce a distinct endothermic peak. Prior to grafting with caprolactone, the 6-amino-1-hexanol treated glass, Functionalized Glass 2, was analyzed with DSC. Although a broad peak was present between 40° and 80° C., initially, a second DSC scan revealed no thermal transition. Since 6-amino-1-hexanol was not present in amounts sufficient to be detected by DSC prior to grafting, it likely did not produce the endothermic transition after grafting and, furthermore, three extractions.

XPS studies also suggested that PCL was retained on the glass surface following three extractions. XPS analysis determined that a relatively large amount of nitrogen (1.8%, atomic) was present on the extracted Grafted Glass 3 surface. The possible sources of nitrogen were (a) initial glass processing from ammonium dihydrogen phosphate and (b) 6-amino-1-hexanol. Nitrogen contamination from glass processing was not likely to result in such high (1.8%) concentrations. Analysis of Table V shows that Grafted Glass 3 contains nitrogen. However, that sample was prepared with 6-amino-1-hexanol. Grafted Glasses 5 and 6 which should not have contained nitrogen, indeed, did not contain the element. Therefore, glass processing was assumed to incorporate only 0.0–0.4 atomic percent nitrogen into Glass Sample 1. Higher nitrogen contents were thus attributed to 6-amino-1-hexanol, as in the case of Grafted Glass 3. As mentioned previously for that sample, the amount of 6-amino-1-hexanol on the glass surface prior to the grafting reaction was below the limits of DSC detection.

It was necessary to determine the amount of nitrogen attributed to 6-amino-1-hexanol for the calculation of the amount of carbon and oxygen which could be attributed to polycaprolactone. The theoretical C/O ratio of polycaprolactone is 3.0. The experimental ratio, based on the XPS data which scanned the outermost 50–100 Å of the surface, was calculated by first subtracting out oxygen which could be attributed to each cation in the following stoichiometric proportions: $P_2O_5$, $Na_2O$, CaO, ZnO, and $SiO_2$. The nitrogen in Grafted Glass 3 was attributed to 6-amino-1-hexanol, $H_2N$—$(CH_2)_6OH$. One unit oxygen was therefore attributed to every one nitrogen. Carbon attributed to 6-amino-1-hexanol was then subtracted from the total amount of carbon. The ratio of remaining carbon to remaining oxygen was then calculated. Grafted Glass 3 possessed the C/O ratio nearest to that of polycaprolactone. Incidentally, the extracted Grafted Glass 3 sample was the only one of the samples to show a melting endotherm for polycaprolactone by DSC.

The extracted Grafted Glass 3 sample was also characterized using high resolution XPS. This analysis revealed that the P—N—C bond was present in the sample, which suggests that the 6-amino-1-hexanol was directly bonded to the glass surface.

FTIR spectroscopic data also suggested that PCL was present on the extracted Grafted Glass 3 surface. The carbon/oxygen double bond (C═O), characteristic of esters, has an absorption band in the region of 1750–1735 $cm^{-1}$. It possesses a high intensity, constant position, and freedom from interfering bands. Consequently, this band is one of the most recognizable in the IR spectra. Both IR absorption spectra and reflectance spectra of extracted Grafted Glass 3 samples revealed the presence of this C═O band near 1728 $cm^{-1}$. A control absorption spectra of unmodified Glass Sample 1 showed the bands near 1300, 900, 700 and 500

$cm^{-1}$ which are due to P=O, P—O—P asymmetric stretching P—O—P symmetric stretching, and P—O—P bending, respectively. Further evidence of the presence of aminohexanol in the extracted Grafted Glass 3 sample is the reflectance band near 1651 $cm^{-1}$ which is indicative of N—H bending. The broad absorption near 3000 $cm^{-1}$ was caused by water (—OH). Peaks at 2948 $cm^{-1}$ and 2866 $cm^{-1}$ were characteristic of C—H stretching. Thus, DSC, XPS, and IR spectroscopic evidence strongly suggests that polycaprolactone was retained on the Grafted Glass 3 surface after three extractions in methylene chloride.

TABLE V

Surface Composition of Extracted Grafted Glass Samples as Determined by XPS

| Glass | % C | % O | % P | % Si | % N | % Na | %Ca | % Zn |
|---|---|---|---|---|---|---|---|---|
| 6 | 22.4 | 59.8 | 12.5 | 3.9 |  | 0.9 |  | 0.4 |
| 5 | 74.0 | 22.2 | 0.6 | 3.1 |  |  |  |  |
| 3 | 48.7 | 40.2 | 7.8 | 1.0 | 1.8 |  |  | 0.4 |

TABLE VI

XPS Carbon:Oxygen Ratios Attributed to Polycaprolactone

| Atom/compound | 6 | 5 | 3 |
|---|---|---|---|
| $P^{5+}$ | 31.25 | 1.5 | 19.5 |
| $Si^{2+}$ | 7.8 | 6.2 | 2.0 |
| $Na^+$ | 0.4 | 0 | 0 |
| $Ca^{2+}$ | 0.45 | 0 | 0 |
| $Zn^{2+}$ | 0 | 0 | 0.4 |
| N (Aminohexanol) | 0 | 0 | 1.8 |
| C (Aminohexanol) | 0 | 0 | 10.8 |
| Remaining O | 19.9 | 14.5 | 16.5 |
| Remaining C | 22.4 | 74.0 | 39.4 |
| C/O Ratio | 1.13 | 5.10 | 2.30 |

A second composite sample, Grafted Glass 4, successfully retained PCL after three extractions. Grafted Glass 4 was surface-treated with 1,6-hexanediol, unlike Grafted Glass 3 which was treated with 6-amino-1-hexanol. One deviation from the normal grafting protocol was performed. About one hour into the grafting reaction, additional monomer and stannous octoate catalyst were added. the final composite polymerized with a relatively high melting temperature. DSC analysis revealed that Grafted Glass 4 also retained PCL after three extractions in methylene chloride. The broad endothermic peak was obtained for the first DSC scan for Grafted Glass 4 after three extractions. Cooling and immediate reheating of the DSC sample revealed the same broad endothermic transition. The DSC sample was then dried for three weeks under vacuum at room temperature after which time DSC was performed for a third time on the sample. The importance of residual solvent removal was apparent in this set of DSC scans as the third run revealed a distinct PCL melting peak at 50.5° C.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A composite comprising an organic, polymeric matrix and a filler, said filler comprising an inorganic glass having an activator covalently bonded thereto, the activator being selected from the group consisting of phosphonyl moieties, silyl moieties, siloxy moieties, and titanyl moieties;

a functionalizing agent comprising an alkane chain having a first reactive site covalently bonded to the activator moiety and a second reactive site which optionally initiates ring opening polymerization; and an aliphatic polymer of an aliphatic, heterocyclic monomer grafted to the second reactive site of the functionalizing agent.

2. The composite set forth in claim 1 wherein the aliphatic polymer is identical to the organic polymer of the matrix.

3. The composite set forth in claim 1 wherein the solubility of the aliphatic polymer is substantially equivalent to the solubility of the organic polymer of the matrix.

4. A composite comprising an inorganic glass having an activator covalently bonded thereto, the activator being selected from the group consisting of phosphonyl moieties, silyl moieties, siloxy moieties, and titanyl moieties;

a functionalizing agent comprising an alkane chain having a first reactive site covalently bonded to the activator moiety and a second reactive site which optionally initiates ring opening polymerization; and an aliphatic polymer of an aliphatic, heterocyclic monomer grafted to the second reactive site of the functionalizing agent.

5. The composite set forth in claim 1 wherein the filler comprises from about 10 to about 90 percent by weight of the composite and the polymeric matrix comprises from about 10 to about 90 percent by weight of the composite.

* * * * *